(12) United States Patent
Andersen et al.

(10) Patent No.: US 11,092,264 B2
(45) Date of Patent: Aug. 17, 2021

(54) DETECTING PARAMETER IN FLEXIBLE PIPE SYSTEM COMPRISING A TURRET

(71) Applicant: National Oilwell Varco Denmark I/S, Brondby (DK)

(72) Inventors: Bo Asp Moller Andersen, Stenlose (DK); Michael Eilersen, Hvidovre (DK); Nicky Weppenaar, Copenhagen K (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 103 days.

(21) Appl. No.: 16/320,633

(22) PCT Filed: Jul. 5, 2017

(86) PCT No.: PCT/DK2017/050229
§ 371 (c)(1),
(2) Date: Jan. 25, 2019

(87) PCT Pub. No.: WO2018/019346
PCT Pub. Date: Feb. 1, 2018

(65) Prior Publication Data
US 2019/0162336 A1 May 30, 2019

(30) Foreign Application Priority Data
Jul. 25, 2016 (DK) .............................. PA 2016 70551

(51) Int. Cl.
*B63B 27/24* (2006.01)
*F16L 11/127* (2006.01)
(Continued)

(52) U.S. Cl.
CPC .......... *F16L 11/127* (2013.01); *F16L 11/083* (2013.01); *F16L 11/12* (2013.01); *F16L 27/08* (2013.01);
(Continued)

(58) Field of Classification Search
CPC . G01L 1/242; B63B 2035/448; B63B 21/508; G01M 5/0091
See application file for complete search history.

(56) References Cited

U.S. PATENT DOCUMENTS

| 6,050,747 A | 4/2000 | Midttveit |
|---|---|---|
| 6,588,357 B1 | 7/2003 | Hobdy |
| (Continued) | | |

FOREIGN PATENT DOCUMENTS

| EP | 2725186 A1 | 4/2014 |
|---|---|---|
| WO | 2008/070643 A2 | 6/2008 |
| (Continued) | | |

OTHER PUBLICATIONS

Danish Search Report for Application No. PA 2016 70551, dated Feb. 16, 2017.

(Continued)

*Primary Examiner* — Andrew Polay
(74) *Attorney, Agent, or Firm* — Pearne & Gordon LLP (57) ABSTRACT

A flexible pipe system includes an unbonded flexible pipe connected to a floating vessel and a sensor system with an optical fibre integrated in the unbonded flexible pipe. Interrogating equipment transmits optical signals into the fibre, receives optical signals reflected from the fibre and detects a parameter of the unbonded flexible pipe. A turret connects the flexible pipe rotationally to the floating vessel via a swivel device that provides a fluid transfer passage between the turret and the vessel. The interrogating equipment is arranged on the turret and is further configured to transfer signals indicative of the detected parameter to receiving equipment on the floating vessel. In this way, optical signals reflected from the fibre can reach the interrogating equipment without distortion in the swivel, so that parameters can (Continued)

be detected with sufficient quality also for floating vessels equipped with a turret mooring system.

11 Claims, 9 Drawing Sheets

(51) Int. Cl.
*F16L 11/08* (2006.01)
*F16L 27/08* (2006.01)
*F16L 33/01* (2006.01)
*G01M 5/00* (2006.01)
*G01L 1/24* (2006.01)
*F16L 11/12* (2006.01)
*F16L 25/01* (2006.01)
*B63B 21/50* (2006.01)

(52) U.S. Cl.
CPC ............ *F16L 33/01* (2013.01); *G01L 1/242* (2013.01); *G01M 5/0025* (2013.01); *G01M 5/0091* (2013.01); *B63B 21/508* (2013.01); *F16L 25/01* (2013.01); *F16L 2201/30* (2013.01)

(56) References Cited

U.S. PATENT DOCUMENTS

| | | | | |
|---|---|---|---|---|
| 9,086,325 | B2* | 7/2015 | Nash | G01V 1/3808 |
| 2004/0042856 | A1 | 3/2004 | Erstad | |
| 2004/0243859 | A1* | 12/2004 | Mueller | B63H 21/22 |
| | | | | 713/300 |
| 2007/0264889 | A1 | 11/2007 | Boatman et al. | |
| 2009/0071173 | A1 | 3/2009 | Eide | |
| 2013/0192707 | A1 | 8/2013 | Graham et al. | |
| 2013/0213290 | A1 | 8/2013 | Bauduin et al. | |
| 2015/0030295 | A1* | 1/2015 | Do | E21B 17/015 |
| | | | | 385/107 |
| 2016/0266001 | A1 | 9/2016 | Mcnab et al. | |
| 2018/0136058 | A1* | 5/2018 | Singer | G01B 11/18 |
| 2019/0039705 | A1* | 2/2019 | Schiffers | H02J 50/12 |

FOREIGN PATENT DOCUMENTS

| | | |
|---|---|---|
| WO | 2015/063457 A1 | 5/2015 |
| WO | 2016/000064 A1 | 1/2016 |

OTHER PUBLICATIONS

Third Party Observation for application No. EP20170833619, dated Feb. 24, 2020.
Third Party Observation for application No. EP20170833619, dated Mar. 19, 2020.
Ukooa Guidance Note on Monitoring Methods and Integrity Assurance for Unbonded Flexible Pipe, Oct. 2002 (MCS International).
OTC 8168 Specification of Electrical, Optical and Hydraulic Swivels for FPSOs, 1996 (Dwyer et al.).
OTC 19051 Fatigue Monitoring of Flexible Risers Using Novel Shape-Sensing Technology, 2007 (Roberts et al.).
Extended European Search Report for Application No. 17833619.4, dated Jan. 27, 2020.
Third Party Observation for application No. EP20170833619, dated Feb. 12, 2021.
"Study on Mooring System Integrity Management for Floating Structures", ABSG Consulting Inc., Aug. 4, 2015.
"Online Riser Monitoring System for Skary FPSO", SF Rasmussen, University of Stavanger, 2012.

* cited by examiner

DETECTING PARAMETER IN FLEXIBLE PIPE SYSTEM COMPRISING A TURRET

TECHNICAL FIELD

The invention relates to a flexible pipe system comprising an unbonded flexible pipe with at least one optical fibre integrated in an armouring layer, where the unbonded flexible pipe is connected rotationally to a floating vessel via a turret and a swivel device. The invention also relates to a method of detecting at least one parameter in an unbonded flexible pipe having at least one armouring layer.

BACKGROUND

Unbonded flexible pipes are well known in the art, in particular for offshore transportation of fluids or gases. They can be used e.g. for the transportation of fluids where very high or varying water pressures exist along the longitudinal axis of the pipe. This is the case e.g. for so-called riser pipes extending partly or totally from the seabed up to an installation on or near the surface of the sea, e.g. in the form of a floating vessel or a platform, or for pipes for transportation of liquid and gases between installations, pipes which are located at great depths on the seabed, or pipes between installations near the surface of the sea.

Such pipes usually comprise a number of concentric layers, including an inner liner, often also referred to as an inner sealing sheath or an inner sheath, which forms a barrier against the outflow of the fluid that is conveyed through the pipe, and one or more armouring layers on the outer side of the inner liner. Typically, at least one of the armouring layers comprises a plurality of helically wound elongated armouring elements arranged around the internal sealing sheath. An outer sheath may be provided to provide a mechanical protection and/or for forming a barrier against the ingress of fluids from the pipe surroundings to the armouring layers.

In this context, the term "unbonded" refers to the fact that at least two of the layers including the armouring layers and sheath layers are not bonded to each other. In practice, an unbonded flexible pipe normally comprises at least two armouring layers located outside the inner sealing sheath, where the armouring layers are not bonded to each other or to other layers directly or indirectly via other layers along the pipe. The pipe layers can therefore move relative to each other, and thereby the pipe becomes highly bendable, usable for dynamic applications, e.g. as risers, and sufficiently flexible to roll up for transportation even when the layers are relatively thick. This is necessary for high strength pipes, which should be able to withstand high pressure differences over layers of the pipe, e.g. pressure differences between the pressure inside the bore of the pipe and the pressure on the outer side of the pipe.

Unbonded flexible pipes can be very long, and since the production of oil is performed at increasing water depths, the length as well as the requirement to strength of the unbonded flexible pipe is increased as well. A main reason for the increased requirements is that the greater the depth at which a flexible pipe is to be used, the higher the requirements will be to strength against collapsing due to external pressure. Furthermore, the weight of the pipe during deployment and use may result in high tensile forces, which increase with the length of the pipe and the depth at the deployment site. The higher the strength that needs to be provided, the more critical the integrity of individual tensile armouring elements becomes.

Therefore, armouring layers need to be monitored for potential breaks in the armouring elements, which could occur during use, even normal use, of the pipe due to the stress that the unbonded flexible pipe is subjected to during its use, in particular when used as a riser.

One way of detecting a break of an elongated armouring element of an unbonded flexible pipe is to use a flexible pipe system, in which the unbonded flexible pipe has a sensor system based on the use of one or more optical fibres at least partly integrated in at least one armouring layer of the unbonded flexible pipe.

Typically, the sensor system comprises interrogating equipment placed on the sea surface installation and a plurality of optical fibre sensors integrated in one or more of the elongated armouring elements of an armouring layer. Each one of these armouring elements has integrated therein at least one optical fibre comprising a plurality of optical fibre sensors. The optical fibre sensors extend along a monitoring length section of the flexible pipe, and they are arranged to measure or determine a change in strain of the respective armouring elements by transmitting a light signal from an optical transmitter in the interrogating equipment into the optical fibre and measuring in an optical detector light that is reflected from the fibre to the interrogating equipment. In the optical detector, or a computing unit to which it is connected, the reflected optical signals are processed for determining changes in e.g. intensity, phase, polarization, wavelength, or transit time of light in the fibre, which indicate a change in the strain and/or temperature along the fibre or at one of the sensors.

In this way, the flexible pipe system can detect changes in strain that the elongated armouring elements experience, e.g. due to movements from waves etc., change in internal pressure, change in buoyancy of the pipe, or other influences. A special case of sudden change in strain is the breaking of an elongated armouring element. Such a failure reduces the residual strength of the flexible pipe and may ultimately result in catastrophic damage to the pipe. Therefore, in general a flexible pipe should be replaced after an elongated armouring element has broken, since this could indicate that other armouring elements may be at risk of breaking soon.

Typically, several sensors are multiplexed along the length of the optical fibre, e.g. by using light wavelength shift for each sensor or by sensing the time delay as a light pulse passes along the fibre through each sensor. In addition to determining a change in strain, optical fibres can also be used as sensors to measure temperature, pressure and other quantities by modifying a fibre so that the quantity to be measured modulates e.g. the intensity, phase, polarization, wavelength, or transit time of light in the fibre.

In principle, any type of optical fibre strain sensors could be employed, but fibre Bragg gratings are particularly advantageous for this use, because fibre optic sensors using fibre Bragg gratings can measure co-located temperature and strain simultaneously with high accuracy. As an alternative to a plurality of optical fibre sensors arranged along a fibre integrated in one of the elongated armouring elements of an armouring layer, distributed temperature sensing along an optical fibre, which uses Raman-shifted backscatter from laser pulses to determine the temperature along the optical fibre, may also be used. Distributed temperature sensing systems measure temperatures by means of the optical fibre functioning as a linear sensor. Temperatures are recorded along the optical fibre, i.e. not at points, but as a continuous profile.

By large water depths and/or in remote areas of the sea, the floating vessel with the sea surface installation for the risers using unbonded flexible pipes may typically be a floating production, storage and offloading (FPSO) unit, which is a floating facility or ship to which the risers coming from the seabed are connected. The FPSO is equipped with processing equipment for separation and treatment of the fluid arriving on board from subsea installation via the risers. Due to the size of an FPSO, the vessel need to be able to rotate freely in horizontal direction according to the directions of winds, waves and sea currents, while the risers remain connected to a fixed part on the seabed, and material is still allowed to pass through. The free rotation of the FPSO according to weather conditions is also referred to as weathervaning. The FPSO will normally lay head to the prevailing environment.

To allow the free rotation, an FPSO is equipped with a turret mooring system, which is usually fitted inside and integrated into a substantially vertical shaft, chamber or compartment in the hull of the FPSO. A turret, which is typically cylindrical, is moored to the seabed with chains, wires and/or anchors, and bearings allow free and unrestricted 360° rotation of the FPSO around the turret, which is thus the geostatic part of the turret mooring system. The risers are connected to the geostatic turret, and a fluid transfer path between the turret and the free weathervaning FPSO rotating around the turret is provided by a swivel device. The turret system is fully passive and does not require active vessel heading control or active rotation systems in the turret or the swivel device.

ANALYSIS AND CONSIDERATIONS

The swivel device may also be arranged to transmit electrical signals between the turret and the free rotating FPSO. Some swivel devices also allow optical signals to be transferred between the turret and the FPSO, typically by using a fibre optic rotary joint having a plurality of optical transmitters and/or a plurality of optical receivers arranged on a rotor and a stator, respectively. In such a plural input/plural pickup system, a rise and fall of the received optical signal strength during rotation is inherent in combination with a large insertion loss and a large variation in loss and polarisation. This means that although swivel devices using fibre optic rotary joints may provide an acceptable performance for the transmission of digitized optical signals, the performance for transmission of analog optical signals through the swivel device is very poor because the signals are distorted by the fibre optic rotary joint.

Thus, the optical signals reflected from a sensing fibre integrated in an unbonded flexible pipe to interrogating equipment placed on the FPSO cannot be passed through a swivel device without being distorted to a degree that prevents the sensor system from detecting changes in strain and/or temperature in the unbonded flexible pipe. This means that on floating vessels equipped with a turret mooring system to allow the free horizontal rotation of the vessel according to weather conditions, sensor systems based on optical fibres integrated in an armouring layer of an unbonded flexible pipe cannot be used with satisfactory results.

SUMMARY

Therefore, it is an object of embodiments of the invention to provide a flexible pipe system comprising a sensor system having an optical fibre integrated in an armouring layer of an unbonded flexible pipe, which can also be used for detecting changes in a parameter such as strain and/or temperature in the unbonded flexible pipe on floating vessels equipped with a turret mooring system.

According to embodiments of the invention the object is achieved in that a flexible pipe system comprises an unbonded flexible pipe comprising at least one armouring layer and connected to a floating vessel; a sensor system comprising at least one optical fibre integrated in the at least one armouring layer of the unbonded flexible pipe; and interrogating equipment having an optical transmitter configured to transmit optical signals into said at least one optical fibre; and an optical detector configured to receive optical signals reflected from said at least one optical fibre and to detect therefrom at least one parameter in said unbonded flexible pipe; a turret for rotationally connecting the unbonded flexible pipe to the floating vessel, said turret being supported by a substantially vertical shaft in the floating vessel and comprising an end-fitting for terminating and securing said unbonded flexible pipe to the turret; and a swivel device for rotationally connecting the turret to the shaft of the floating vessel and providing a fluid transfer passage between the turret and the floating vessel, wherein said interrogating equipment is arranged on said turret and is further configured to transfer signals indicative of said at least one detected parameter to receiving equipment on said floating vessel.

When the interrogating equipment is arranged on the turret, it is achieved that the optical signals reflected from the fibre can reach the interrogating equipment without being distorted in a swivel device, so that parameters for the unbonded flexible pipe can be detected with a sufficient quality also in cases where a floating vessel is equipped with a turret mooring system. The possibility of transferring signals indicative of the parameter detected in the interrogating equipment to receiving equipment on the floating vessel ensures that the parameters of the unbonded flexible cable can still be monitored e.g. by monitoring equipment or personnel in a control room on board the floating vessel.

In an embodiment, the interrogating equipment comprises a transmitter for transmitting said signals indicative of said at least one detected parameter to the receiving equipment on said floating vessel.

In this case, the flexible pipe system may be configured to transmit said signals through said swivel device, and the transmitter for transmitting said indicative signals may be configured to transmit the signals as analog electrical signals, digital electrical signals or digital optical signals. In case of digital electrical or digital optical signals, the transmitter for transmitting said indicative signals may be configured to transmit the signals as Ethernet signals.

Alternatively, the transmitter for transmitting said indicative signals may be configured to transmit the signals as wireless signals, or the interrogating equipment may comprise a storage medium for storing said indicative signals for subsequent manual retrieval.

Expediently, the receiving equipment may be arranged in a local instrumentation room on said floating vessel, where the detected parameters can be monitored by monitoring equipment or personnel on board the floating vessel.

In an embodiment, said interrogating equipment is arranged in an enclosure that is certified according to ATEX Zone 1 and rated to IP68. This protects the equipment against the quite tough environment in the turret compartment.

In an embodiment, the floating vessel is a floating production, storage and offloading unit, FPSO.

The turret may be an internal turret located in the hull of said floating vessel. This embodiment is most useful in relatively harsh environments, among other things because the mooring forces can be transferred more easily into the hull of the floating vessel.

Alternatively, the turret may be an external turret located in a projection extending from the hull of said floating vessel. This embodiment is mostly used in relatively calm waters, and it can easily be mounted e.g. on a tanker in order to convert the tanker to an FPSO.

Expediently, the turret may have a cylindrical shape. This facilitates the rotation in the shaft of the floating vessel.

In an embodiment, the turret is configured to be separated along a disconnection plane into a lower part for receiving the unbonded flexible pipe and an upper part comprising the interrogating equipment. This allows the floating vessel to release the lower part of the turret and move to another position, e.g. in case of an emergency situation, such as a cyclone or an iceberg, or just to be connected to another turret at the other position.

In an embodiment, the turret is configured to connect a plurality of unbonded flexible pipes to the floating vessel. This increases the capacity of the vessel considerably.

In an embodiment, a plurality of optical fibre sensors are arranged along said optical fibre. The plurality of optical fibre sensors may be intrinsic sensors integrated in said optical fibre, and each one of said intrinsic sensors may then comprise a fibre Bragg grating. Alternatively, the plurality of optical fibre sensors may be extrinsic sensors connected to said optical fibre.

The sensor system may comprise a plurality of optical fibres integrated in corresponding armouring elements of an armouring layer of the unbonded flexible pipe, and each of said plurality of optical fibres may comprise a plurality of optical fibre sensors arranged with equal distances between them along the fibre, so that a plurality of optical fibre sensors are arranged at coinciding cross sections of the unbonded flexible pipe. This improves the accuracy of the measurements in the unbonded flexible pipe.

In embodiments in which a plurality of optical fibre sensors are arranged along said optical fibre, the sensor system may comprise at least one further optical fibre integrated in an armouring element of an armouring layer of the unbonded flexible pipe, and said interrogating equipment may be configured to perform distributed temperature sensing by transmitting laser pulses into said further fibre and determining temperatures along said further fibre based on Raman-shifted backscatter from said laser pulses. This allows the fibre with a plurality of optical fibre sensors to be used for strain detection and the further fibre to be used for temperature detection.

In other embodiments, the interrogating equipment may be configured to perform distributed temperature sensing by transmitting laser pulses into said optical fibre and determining temperatures along said optical fibre based on Raman-shifted backscatter from said laser pulses.

As mentioned, the invention further relates to a method of detecting at least one parameter in an unbonded flexible pipe having at least one armouring layer in a flexible pipe system further comprising a turret for rotationally connecting the unbonded flexible pipe to a floating vessel, said turret being supported by a substantially vertical shaft in the floating vessel and comprising an end-fitting for terminating and securing said unbonded flexible pipe to the turret; a swivel device for rotationally connecting the turret to the shaft of the floating vessel and providing a fluid transfer passage between the turret and the floating vessel; and a sensor system comprising at least one optical fibre integrated in the at least one armouring layer of the unbonded flexible pipe, the method comprising the steps of transmitting optical signals into said at least one optical fibre from an optical transmitter of interrogating equipment arranged on said turret; receiving optical signals reflected from said at least one optical fibre and detecting therefrom at least one parameter in said unbonded flexible pipe in an optical detector of said interrogating equipment arranged on said turret; and transferring signals indicative of said at least one detected parameter to receiving equipment on said floating vessel from said interrogating equipment arranged on said turret.

When the optical signals reflected from the optical fibre are received and at least one parameter in said unbonded flexible pipe is detected therefrom in an optical detector of interrogating equipment arranged on the turret, it is achieved that the optical signals reflected from the fibre can reach the interrogating equipment without being distorted in a swivel device, so that parameters for the unbonded flexible pipe can be detected with a sufficient quality also in cases where a floating vessel is equipped with a turret mooring system. Transferring signals indicative of the detected parameter to receiving equipment on the floating vessel from the interrogating equipment arranged on the turret ensures that the parameters of the unbonded flexible cable can still be monitored e.g. by monitoring equipment or personnel in a control room on board the floating vessel.

In an embodiment, the method further comprises the step of transmitting said signals indicative of said at least one detected parameter to the receiving equipment on said floating vessel from said interrogating equipment arranged on said turret.

In this case, the method may further comprise the step of transmitting said indicative signals through said swivel device, and the indicative signals may be transmitted as analog electrical signals, digital electrical signals or digital optical signals. In case of digital electrical signals or digital optical signals, the indicative signals may be transmitted as Ethernet signals.

Alternatively, the indicative signals may be transmitted as wireless signals, or the indicative signals may be stored on a storage medium in said interrogating equipment for subsequent manual retrieval.

BRIEF DESCRIPTION OF THE DRAWINGS

Embodiments of the invention will now be described more fully below with reference to the drawings, in which.

DETAILED DESCRIPTION

Figure 1:
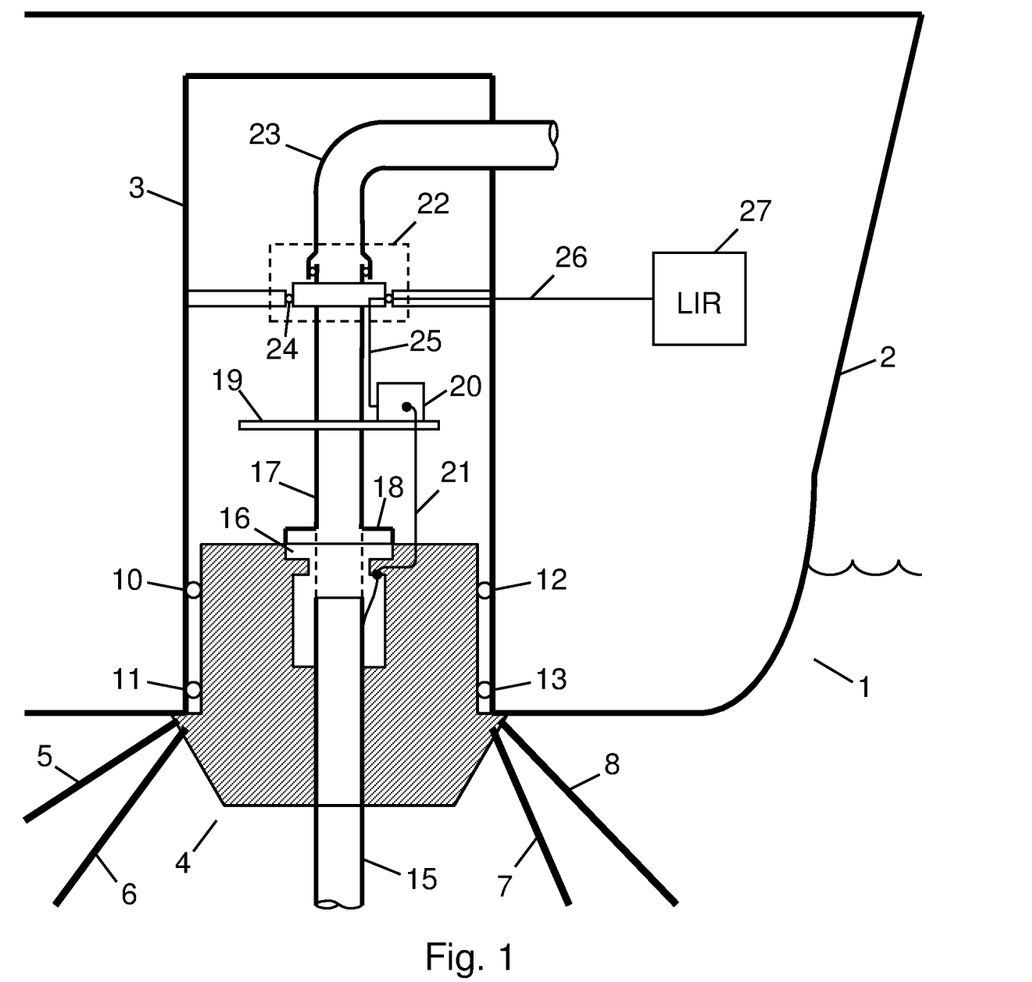
FIG. 1 shows a floating production, storage and offloading (FPSO) unit having a turret on which interrogating equipment is arranged for performing measurements on an optical fibre integrated in an unbonded flexible pipe connected to the turret.

As an example of a floating vessel, in which the invention can be used, FIG. 1 shows a floating production, storage and offloading (FPSO) unit 1 that can be used as a sea surface installation in the offshore oil and gas industry for separating, treating and storing liquids and/or gases arriving on board from e.g. subsea oil wells via unbonded flexible pipes acting as so-called risers. The hull 2 of the FPSO 1 is provided with a substantially vertical shaft, chamber or compartment 3, typically having a cylindrical form, for receiving and supporting a turret 4. The typically cylindrical turret 4 is moored to the seabed by chains or wires 5, 6, 7 and 8 ensuring that the turret can maintain a geostatic position. The turret 4 also has bearings 10, 11, 12 and 13 between the turret and the supporting shaft 3 allowing the FPSO 1 to rotate 360° in a horizontal plane freely and unrestricted around the geostatic turret 4 according to the directions of winds, waves and sea currents. The free rotation of the FPSO 1 according to weather conditions is also referred to as weathervaning. A riser in the form of an unbonded flexible pipe 15 coming from the seabed is connected to the turret 4 by means of an end-fitting 16.

Figure 2:
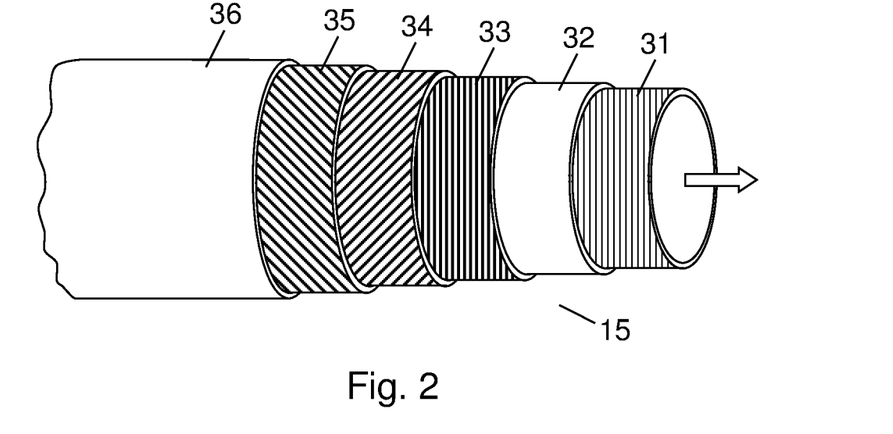
FIG. 2 shows an example of an unbonded flexible pipe comprising a number of concentric layers.

An example of an unbonded flexible pipe 15 comprising a number of concentric layers is illustrated in FIG. 2. The flexible pipe 15 comprises a liquid impervious inner sealing sheath 32 defining a bore as indicated with the bold arrow. The inner sealing sheath 32, often also called an inner liner, can be made of a polymer material suitable for forming such liquid impervious barrier. The inner sealing sheath 32 has the purpose of preventing outflow of the fluid transferred in the bore of the pipe, indicated with the bold arrow.

Inside the inner sealing sheath 32, the unbonded flexible pipe comprises an inner armour layer 31 called a carcass, which is normally of metal and has the main purpose of reinforcing the unbonded flexible pipe against collapse.

On the outer side of the inner sealing sheath 32, the unbonded flexible pipe comprises three outer armouring layers 33, 34 and 35. The outer armouring layer 33 closest to the inner sealing sheath 32 is a pressure armour layer 33, which is often made of helically wound armour elements of metal or composite material, which is wound with a short pitch, i.e. with a steep angle to the centre axis of the unbonded flexible pipe, e.g. close to 90 degrees. The pressure armour layer 33 is not liquid tight.

Around the pressure armour layer 33, the unbonded flexible pipe comprises two cross-wound tensile armour layers 34, 35 wound from elongate armour elements, e.g. profiles and/or strips made of composite material and/or metal. For example, the elongate armouring elements on the innermost tensile armour layer 34 are wound with a winding degree of about 55 degrees or less to the axis of the unbonded flexible pipe in a first winding direction, while the outermost tensile armour layer 35 is wound with a winding degree of about 60 degrees or less to the axis of the unbonded flexible pipe in a second winding direction, which is the opposite direction to the first winding direction. The two armour layers with such opposite winding direction are normally referred to as being cross-wound.

The unbonded flexible pipe further comprises a liquid impervious outer sealing sheath 36, which protects the armour layers mechanically and against ingress of sea water.

This type of flexible pipe is called unbonded because at least two of the layers including the armouring layers and sheath layers are not bonded to each other. In practice, the armouring layers are not bonded to each other or to other layers directly or indirectly via other layers along the pipe. The pipe layers can therefore move relative to each other, and thereby the pipe becomes highly bendable, usable for dynamic applications e.g. as risers, and sufficiently flexible to roll up for transportation even when the layers are relatively thick.

In order to be able to monitor armouring layers, e.g. one of the layers 33, 34 and 35, of the unbonded flexible pipe 15 for potential breaks in the helically wound armouring elements, which could occur during use of the pipe due to the stress that the unbonded flexible pipe is subjected to during its use, the unbonded flexible pipe may be provided with one or more optical fibres at least partly integrated in one or more armouring elements of at least one armouring layer of the unbonded flexible pipe.

Figure 3:
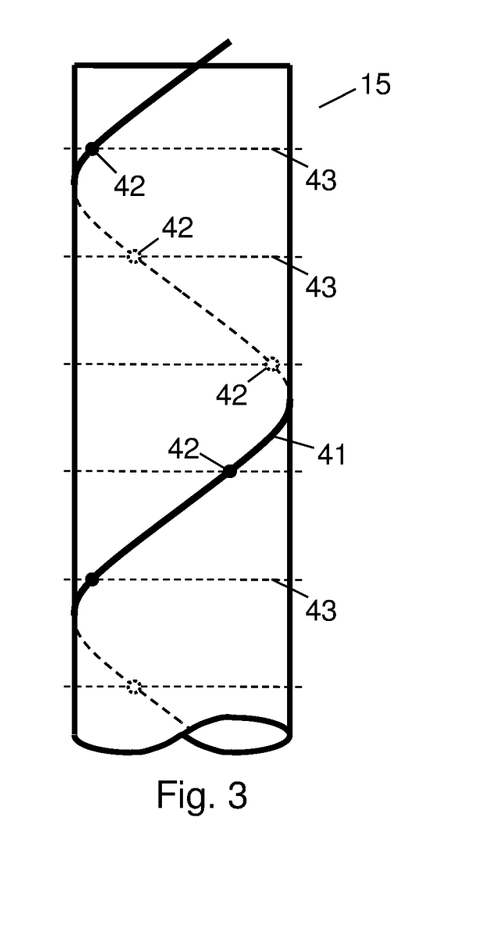
FIG. 3 shows an example of an optical fibre with a plurality of optical fibre sensors integrated in a helically wound armouring element of an armouring layer in the unbonded flexible pipe of FIG. 2.

FIG. 3 shows an example of an optical fibre 41 integrated in an unbonded flexible pipe 15. Since the fibre 41 is integrated in a helically wound armouring element of one of the armouring layers 33, 34 and 35, the pitch of the fibre 41, i.e. the angle to the centre axis of the unbonded flexible pipe, corresponds to that of the armouring element. Along the fibre 41, a plurality of optical fibre sensors 42 are arranged to measure or detect changes in e.g. strain or temperature of the armouring element on their respective locations.

The optical fibre sensors 42 are arranged with equal distances between them so that measurements can be performed at corresponding cross sections 43 of the unbonded flexible pipe 15.

Figure 4:
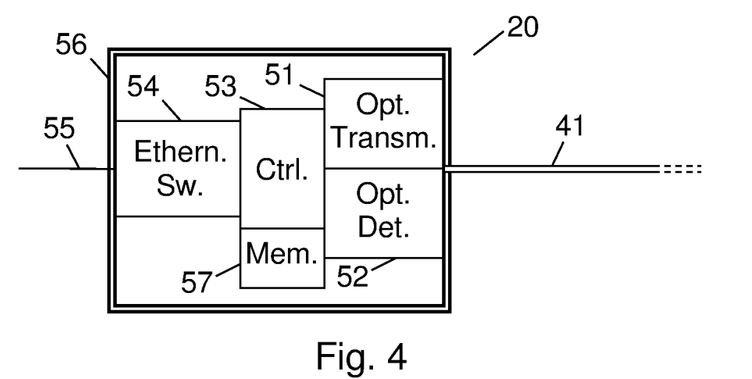
FIG. 4 shows an example of interrogating equipment for performing measurements on the fibre of FIG. 3.

The measurement or detection of changes in strain or temperature along the fibre 41 is performed by transmitting a light signal into one end of the fibre and detecting light that is reflected from the fibre. To this purpose, interrogating equipment is used. FIG. 4 illustrates an example of interrogating equipment 20 connected to the fibre 41. An optical transmitter 51 generates an optical signal and transmits it into the fibre 41. As described in further detail below, light is reflected from each sensor 42 in the fibre 41 and then received and processed in an optical detector 52. Light reflected from the individual optical fibre sensors 42 can be distinguished e.g. by using light wavelength shift for each sensor or by sensing the time delay as a light pulse passes along the fibre 41 through each sensor. A controller 53 controls the optical transmitter 51 to transmit light, i.e. light pulses or continuous light and the wavelength of the light, and the optical receiver 52 to receive the reflected light, e.g. at the right times and at the right wavelengths. The controller 53 may also analyse the reflected light in order to determine the parameters to be measured, such as temperature and strain along the unbonded flexible pipe, or it may just convert the received light values to a more robust signal type and transmit them to further computation elsewhere on the FPSO 1, e.g. in a local instrumentation room. To be able to transmit signals representing determined parameters or received light values to such other location, the interrogation equipment 20 further comprises an Ethernet switch 54 connected to a cable 55, which may be a twisted pair or a fiber optic link. In other embodiments, the signals representing determined parameters or received light values may be transmitted to the instrumentation room according to other protocol types or as analog electrical or optical signals. Another possibility is to transmit the signals wirelessly to the instrumentation room. Alternatively, the data can be stored on a storage medium or memory 57 in the interrogation equipment 20 and subsequently retrieved manually at a certain frequency. The storage medium 57 can be any storage medium suitable for storing data. As examples can be mentioned memory cards, USB sticks, CD-ROMs, DVDs or a hard disk.

Normally, the optical fibre sensors 42 are integrated in the fibre 41 itself as so-called intrinsic sensors. Different types of optical fibre sensors can be employed, but fibre Bragg gratings are particularly advantageous for this use, because fibre optic sensors using fibre Bragg gratings can measure co-located temperature and strain simultaneously with high accuracy. A fibre Bragg grating is a distributed Bragg reflector constructed in a short segment of the optical fibre that reflects particular wavelengths of light and transmits all others. This is achieved by a periodic variation in the refractive index of the fibre core, which provides a wavelength-specific dielectric mirror. The Bragg wavelength is sensitive to strain as well as to temperature. Thus, fibre Bragg gratings can be used as sensing elements for one of these parameters in optical fibre sensors, because the parameters cause a shift in the Bragg wavelength, which can then be detected in the optical detector 52.

Instead of using intrinsic sensors integrated in the fibre 41 itself, the fibre may also just be used as a means of relaying signals from remote non-fibre optical sensors to the interrogating equipment, which is referred to as extrinsic sensors.

As shown in FIG. 1, the unbonded flexible pipe 15 is connected to or received by the turret 4 by means of an end-fitting 16. In this embodiment, the turret 4 further comprises a pipe 17 connected to the end-fitting 16 by means of a flange 18, so that the flow of liquids and/or gases arriving on board the FPSO 1 from e.g. subsea oil wells via the unbonded flexible pipe 15 continues through the pipe 17. A platform 19 on which the interrogating equipment 20 can be arranged is attached to the pipe 17. Alternatively, the interrogating equipment 20 can be arranged directly at the top side of the turret 4 itself next to the flange 18.

The environment in the turret compartment can be quite tough, and therefore, the interrogating equipment 20 is arranged in an enclosure 56 that is certified according to ATEX Zone 1, i.e. a place in which an explosive atmosphere consisting of a mixture with air of dangerous substances in the form of gas, vapor or mist is likely to occur in normal operation occasionally. The enclosure 56 is further rated to IP68, and it is designed with an ambient temperature rating of −40° C. to +60° C.

To connect the fibre 41 to the interrogating equipment at the end of the unbonded flexible pipe 15, the end-fitting 16 can be provided with a fibre exit cavity with means for connecting the fibre 41 via the end-fitting 16 to the interrogating equipment or to another waveguide leading to the interrogating equipment.

Figure 5:
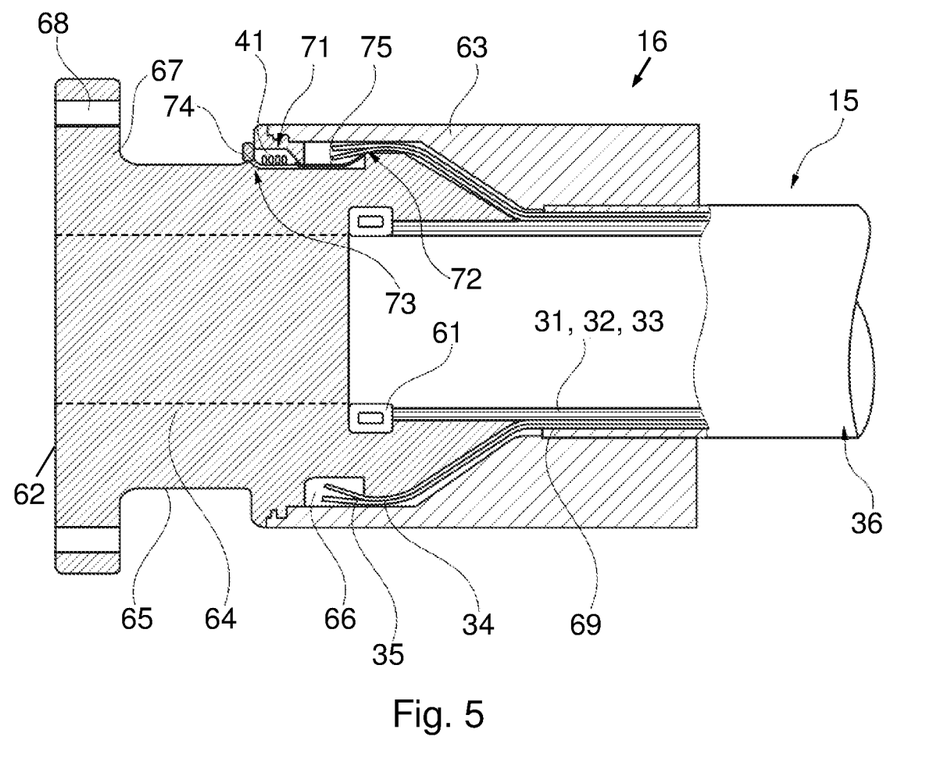
FIG. 5 shows a schematic cross-sectional side view of an example of an end-fitting for terminating an unbonded flexible pipe in the turret of FIG. 1.

FIG. 5 illustrates a schematic cross-sectional side view of an example of an assembly of the flexible pipe 15 and the end-fitting 16, wherein the optical fibre has an overlength in the fibre exit cavity of the end-fitting. As in FIG. 2, the unbonded flexible pipe 15 comprises an outer sealing sheath 36 surrounding two cross-wound tensile armour layers 34 and 35. Inside the cross-wound tensile armour layers 34 and 35, the pipe comprises a number of other layers, including e.g. the carcass 31, the inner sealing sheath 32 and the pressure armour layer 33. The layers 31, 32 and 33 inside the cross-wound tensile armour layers 34 and 35 will usually be terminated individually, as shown schematically in the drawing with the terminating unit 61.

The end-fitting 16 comprises an annular end-fitting body structure 62 and an annular outer casing 63. The end-fitting body structure 62 comprises an end-fitting body 64 with a narrow section 65, a housing cavity 66, and a mounting flange 67 with holes 68 for mounting to another part, e.g. the turret 4. The housing cavity 66 is formed between the end-fitting body 64 and the outer casing 63. The outer sealing sheath 36 is terminated at a termination point 69 in well known manner. The tensile armour elements of the tensile armour layers 34 and 35 are terminated and secured by securing material in the housing cavity 66 of the end-fitting 16.

The end-fitting 16 further comprises a fibre exit cavity 71 with an entrance end 72 and an exit opening 73 through which the fibre 41 can exit. The fibre is applied in an overlength in the fibre exit cavity 71, which means that the optical fibre section in the exit cavity 71 is longer than the length from the entrance end 72 to the exit opening 73 of the exit cavity.

In this embodiment, the end-fitting 16 comprises a lid 74 covering the exit opening 73. The optical fibre 41 is terminated in the exit cavity 71 in that it is at least temporally fixed to the lid 74. The end-fitting 16 comprises a fibre guide unit 75 arranged in the housing cavity 66 and the optical fibre 41 is passing through said fibre guide unit 75. Alternatively, the fibre may be terminated within the exit cavity 71 and mounted with a connector for fast and simple mounting to e.g. the interrogating equipment 20 or a waveguide leading to the interrogating equipment 20. A lid may then cover the exit cavity 71 at its exit opening 73 to protect the fibre against dust and dirt and simultaneously ensuring a mechanical protection. In use, the lid can be removed and the fibre connector can be withdrawn for connection to the interrogating equipment 20.

In FIG. 1, an optical fibre 21, or another type of optical waveguide, connects the optical fibre 41 to the interrogating equipment 20, but as mentioned, the overlength of the fibre 41 in the exit cavity 71 may also be sufficiently long for connecting the fibre 41 directly to the interrogating equipment 20. Since the interrogating equipment 20 is placed on the geostationary turret 4, a connection of sufficient quality between the optical fibre 41 and the interrogating equipment 20 is ensured, even when the FPSO 1 rotates around the turret 4 according to changing weather conditions.

A swivel device 22 joins the pipe 17 on the geostationary turret 4 with another pipe 23, which is a part of the FPSO 1 and thus able to turn with respect to the geostationary turret 4. The pipe 23 leads to processing equipment and/or storage on the FPSO. In this way, the swivel device 22 provides a fluid transfer path between the turret 4 and the free weathervaning FPSO 1 when the FPSO rotates around the turret. Through a slip ring 24, the swivel device 22 can transmit electrical signals between the turret 4 and the FPSO 1. In this case, an electrical output signal from the interrogation equipment 20 can be transmitted via the electrical connection 25, the slip ring 24 and the electrical connection 26 to a local instrumentation room 27 placed on board the FPSO 1. This connection can of course also be used to control the interrogating equipment 20 from the local instrumentation room 27. As mentioned above, this connection may typically be an Ethernet connection.

It is noted that the slip ring 24 may also allow optical signals to be transferred between the turret and the FPSO, typically by using a fibre optic rotary joint having a plurality of optical transmitters and/or a plurality of optical receivers arranged on a rotor and a stator, respectively. However, in such a plural input/plural pickup system, a rise and fall of the received optical signal strength during rotation is inherent in combination with a large insertion loss and a large variation in loss and polarisation. This means that although a swivel device using a fibre optic rotary joint may provide an acceptable performance for the transmission of digitized optical signals, e.g. Ethernet signals, the performance for transmission of analog optical signals through the swivel device is very poor because the signals are distorted by the fibre optic rotary joint. Thus, the optical signals reflected from the sensing fibre 41 integrated in the unbonded flexible pipe 15 cannot be passed through a swivel device without being distorted to a degree that prevents the sensor system from detecting changes in strain and/or temperature in the unbonded flexible pipe 15. This problem is avoided by placing the interrogating equipment 20 on the geostationary turret 4.

In FIG. 3, an unbonded flexible pipe 15 with a single optical fibre 41 integrated in a helically wound armouring element of one of the armouring layers was shown. To improve the measurements of strain and/or temperature in the pipe, an unbonded flexible pipe may be provided with several optical fibres integrated in corresponding armouring elements. As an example, FIG. 6 shows an unbonded flexible pipe 80 having four optical fibres 81, 82, 83 and 84 integrated in the armouring elements.

Along each fibre, a plurality of optical fibre sensors 85 are arranged to measure or detect changes in e.g. strain or temperature of the armouring element on their respective locations. As in FIG. 3, the optical fibre sensors 85 of each fibre are arranged with equal distances between them, and in this embodiment, sensors 85 belonging to different optical fibres are arranged so that measurements can be performed at coinciding cross sections 86 of the unbonded flexible pipe 80. To perform the measurements of strain and/or temperature along the four fibres 81, 82, 83 and 84, the optical transmitter 51 and the optical receiver 52 of the interrogating equipment 20 may be multiplexed between the fibres, or the interrogating equipment 20 may have separate transmitters and receivers for each fibre.

Figure 6:
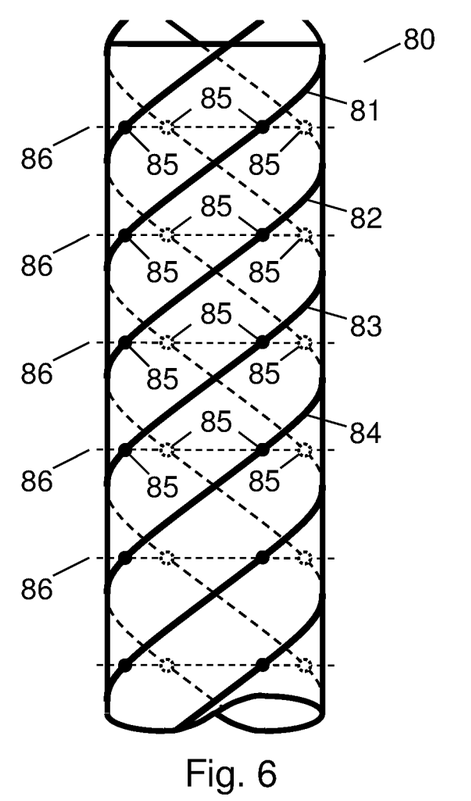
FIG. 6 shows an unbonded flexible pipe having four optical fibres with optical fibre sensors integrated in the armouring elements of an armouring layer.

Instead of, or as a supplement to, using fibres having a plurality of optical fibre sensors arranged along the fibre integrated in one of the elongated armouring elements of an armouring layer as shown in FIGS. 3 and 6, distributed temperature sensing along an optical fibre, which uses Raman-shifted backscatter from laser pulses to determine the temperature along the optical fibre, may also be used. Distributed temperature sensing systems measure temperatures by means of the optical fibre functioning as a linear sensor. Temperatures are recorded along the optical fibre, i.e. not at points, but as a continuous profile.

Distributed temperature sensing is based on the fact that physical measurement dimensions, such as temperature or pressure and tensile forces, can affect a glass fibre and locally change the characteristics of light transmission in the fibre. As a result of the damping of the light in the quartz glass fibre through light scattering, also known as Raman scattering, occurring in the optical fibre, the location of an external physical effect can be determined so that the optical fibre can be employed as a linear sensor. The optical fibre is passive in nature and has no individual sensing points.

Figure 7:
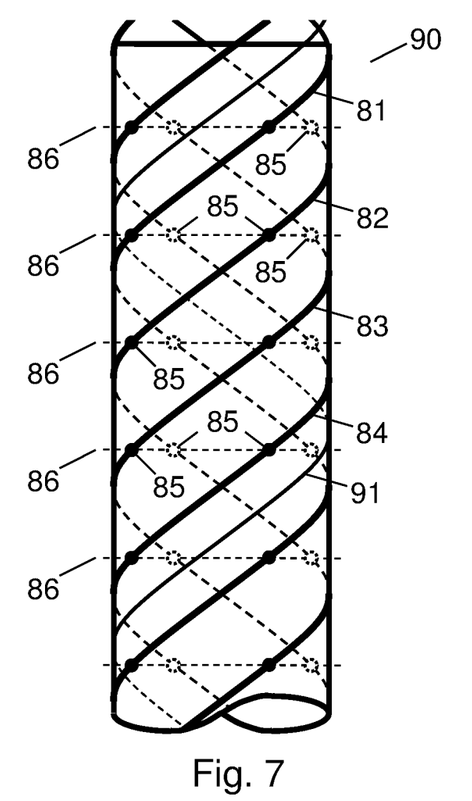
FIG. 7 shows the unbonded flexible pipe of FIG. 6 having a further fibre integrated in a helically wound armouring element of one of the armouring layers, which is used for distributed temperature sensing.

Thus, FIG. 7 shows an unbonded flexible pipe 90 having a further fibre 91 in addition to the four fibres 81, 82, 83 and 84 of FIG. 6. Like the four fibres 81, 82, 83 and 84, the fibre 91 is integrated in a helically wound armouring element of one of the armouring layers, but in contrast to the fibres 81, 82, 83 and 84, the fibre 91 does not have any optical fibre sensors arranged along the length of the fibre. Instead, the fibre 91 is used for distributed temperature sensing as described above.

Figure 8:
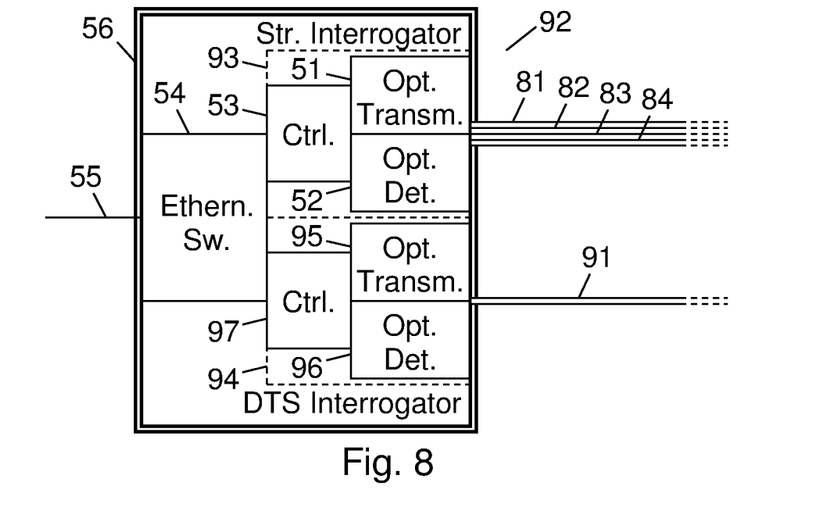
FIG. 8 shows an example of interrogating equipment for performing measurements on the fibres of the unbonded flexible pipe of FIG. 7.

FIG. 8 shows an example of an interrogating equipment 92 for use with the unbonded flexible pipe 90 having fibres 81, 82, 83 and 84 with optical fibre sensors arranged along the length of the fibre as well as a fibre 91 used for distributed temperature sensing. The interrogating equipment 92 comprises a strain interrogator 93 for detecting variations in strain via the fibres 81, 82, 83 and 84 and a distributed temperature sensing (DTS) interrogator 94 for detecting variations in temperature via the fibre 91. Similarly to the interrogating equipment 20 of FIG. 4, the strain interrogator 93 comprises an optical transmitter 51, an optical detector 52 and a controller 53 to control the optical transmitter 51 to transmit light and the optical receiver 52 to receive light reflected from the optical fibre sensors 85 of the fibres 81, 82, 83 and 84. The DTS interrogator 94 comprises an optical transmitter 95 for generating laser pulses and emitting them into the fibre 91 and an optical detector 96 for receiving optical signals reflected from the fibre 91. From a delay profile of the reflected signals the optical detector 96 can determine temperature variations along the fibre 91 and thus along the unbonded flexible pipe 90. A controller 97 controls the functions of the optical transmitter 95 and the optical detector 96.

In FIG. 8, the fibres 81, 82, 83, 84 and 91 are shown as being directly connected to the interrogation equipment 92, which means that each one of these fibres has an overlength in an exit cavity of the end fitting 16 that is sufficiently long for connecting the fibre directly to the interrogating equipment 92. Alternatively, a separate optical fibre, or another type of optical waveguide, may connect each of the fibres 81, 82, 83, 84 and 91 to the interrogating equipment 20 by using optical connectors in the exit cavities of the end fitting 16. It is also noted that in this situation, the line representing the fibre 21 in FIG. 1 represents the five fibres connected to the fibres 81, 82, 83, 84 and 91, respectively, in the exit cavities of the end fitting 16.

To be able to transmit signals representing determined parameters or received light values to further computation elsewhere on the FPSO 1, e.g. in a local instrumentation room, the interrogation equipment 92 also comprises an Ethernet switch 54 connected to a cable 55, which may be a twisted pair or a fiber optic link. The Ethernet switch 54 is also connected to the controllers 53 and 97 so that the instrumentation room can receive information from and send instructions to the strain interrogator 93 as well as the DTS interrogator 94.

Figure 9:
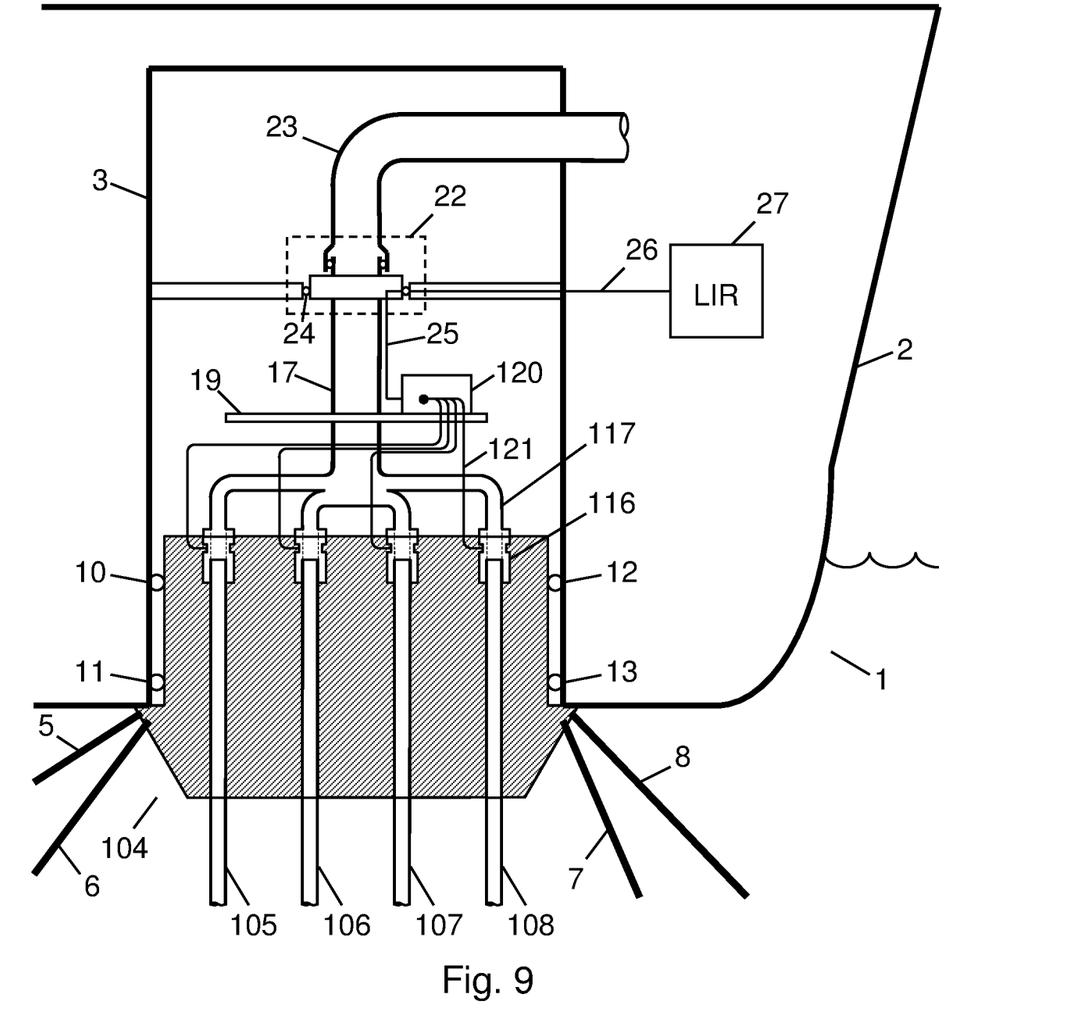
FIG. 9 shows a floating production, storage and offloading (FPSO) unit having a turret on which interrogating equipment is arranged for performing measurements on optical fibres integrated in four unbonded flexible pipes connected to the turret.

In some embodiments, several risers in the form of unbonded flexible pipes coming from the seabed may be connected to the same turret. An example of this is shown in FIG. 9, where the turret 104 receives four unbonded flexible pipes 105, 106, 107 and 108. Similarly to FIG. 1, each unbonded flexible pipe 105, 106, 107 and 108 is connected to or received by the turret 104 by means of an end-fitting 116. A pipe 117 is connected to each end-fitting 116, so that the flow of liquids and/or gases arriving on board the FPSO 1 from e.g. subsea oil wells via the unbonded flexible pipes 105, 106, 107 and 108 continues through the corresponding pipes 117. The four pipes 117 are combined to the main pipe 17, so that the flow of liquids and/or gases from all four unbonded flexible pipes 105, 106, 107 and 108 can be transferred through the pipe 17, the swivel device 22 and the pipe 23 to processing equipment and/or storage on the FPSO.

As in FIG. 1, each optical fibre of one of the unbonded flexible pipes 105, 106, 107 and 108 is connected to the interrogating equipment 120 by an optical connection 121, e.g. an optical fibre or another type of optical wave-guide, or the overlength of the fibre in the exit cavity 71 of the corresponding end fitting 116 may be sufficiently long for connecting the fibre directly to the interrogating equipment 120. Thus, as examples, if an unbonded flexible pipe 15 having only one integrated fibre 41 as shown in FIG. 3 is used, the optical connection 121 can be a single optical fibre, while it can consist of five optical fibres connected to the fibres 81, 82, 83, 84 and 91, respectively, if unbonded flexible pipe 90 having five integrated fibres as shown in FIG. 7 is used. The interrogating equipment 120 may comprise interrogators for each one of the four unbonded flexible pipes 105, 106, 107 and 108, or separate interrogating equipment may be used for each unbonded flexible pipe.

Figure 10:
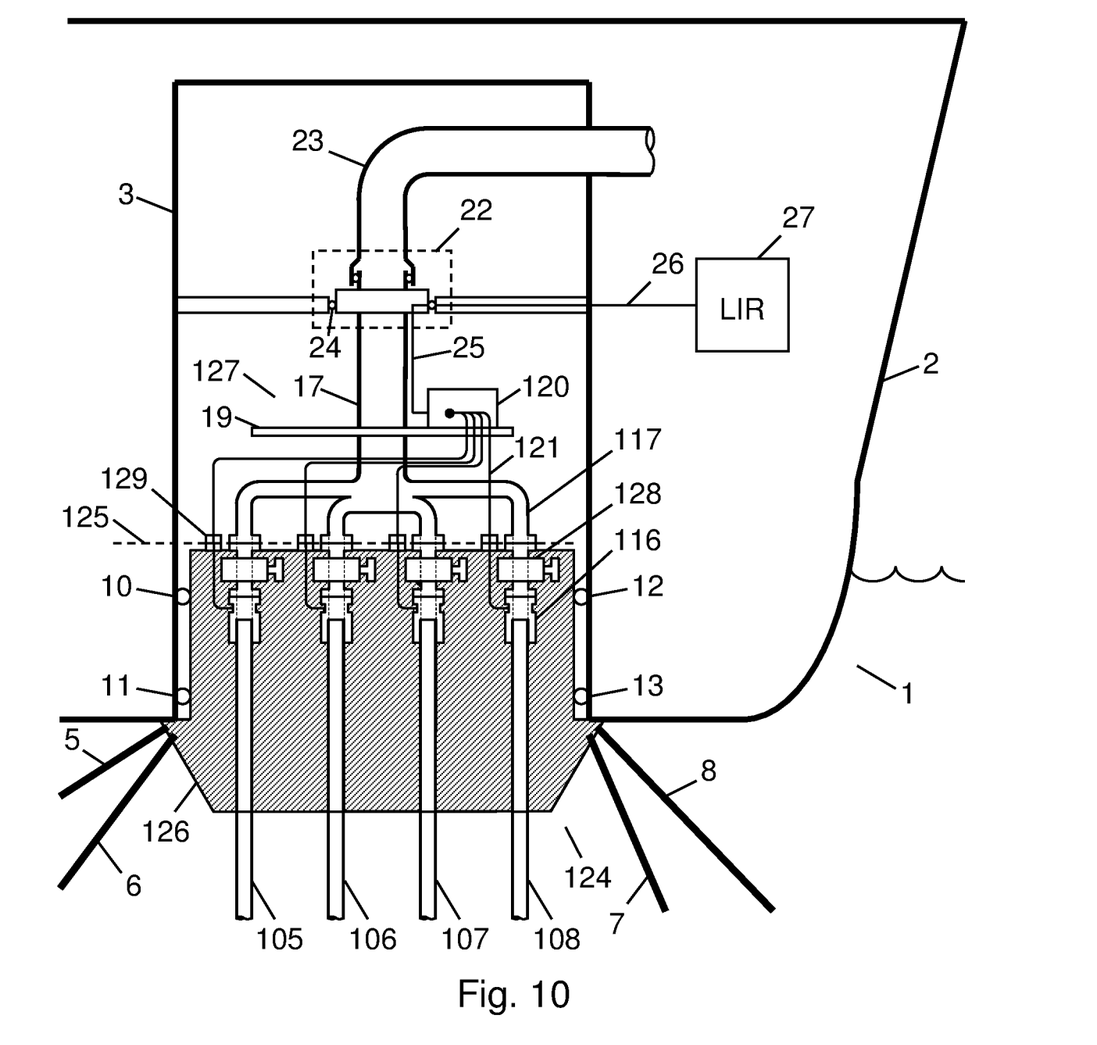
FIG. 10 shows a floating production, storage and offloading (FPSO) unit having a turret, which can be separated along a disconnection plane into a lower part for receiving the unbonded flexible pipes and an upper part comprising the interrogating equipment.

In another embodiment, a turret may be separated into two parts, which is illustrated with the turret 124 in FIG. 10, which can be separated along the disconnection plane 125 into a lower part 126 for receiving the unbonded flexible pipes 105, 106, 107 and 108 in the end fittings 116 and an upper part 127 comprising the pipes 17 and 117 and the platform 19 for the interrogating equipment 120. This allows the FPSO to release the lower part 126 of the turret and move to another position, e.g. in case of an emergency situation, such as a cyclone or an iceberg, or just to be connected to another turret at the other position. The lower part 126 of the turret will then sink beneath the waves and can be reconnected later.

To facilitate such disconnection, each unbonded flexible pipe 105, 106, 107 and 108 is provided with a valve 128 that allows the flow of liquids and/or gases from that pipe to be cut off before disconnection. Also each optical fibre 121 connecting the end fitting 116 to the interrogating equipment 120 is arranged to be disconnected by dividing the fibre into two sections that can be connected to each other by means of optical connectors 129. Since the connector parts of the optical connector 129 can be left below the water when disconnected, so-called subsea wet-mate connectors must be used.

Figure 11:
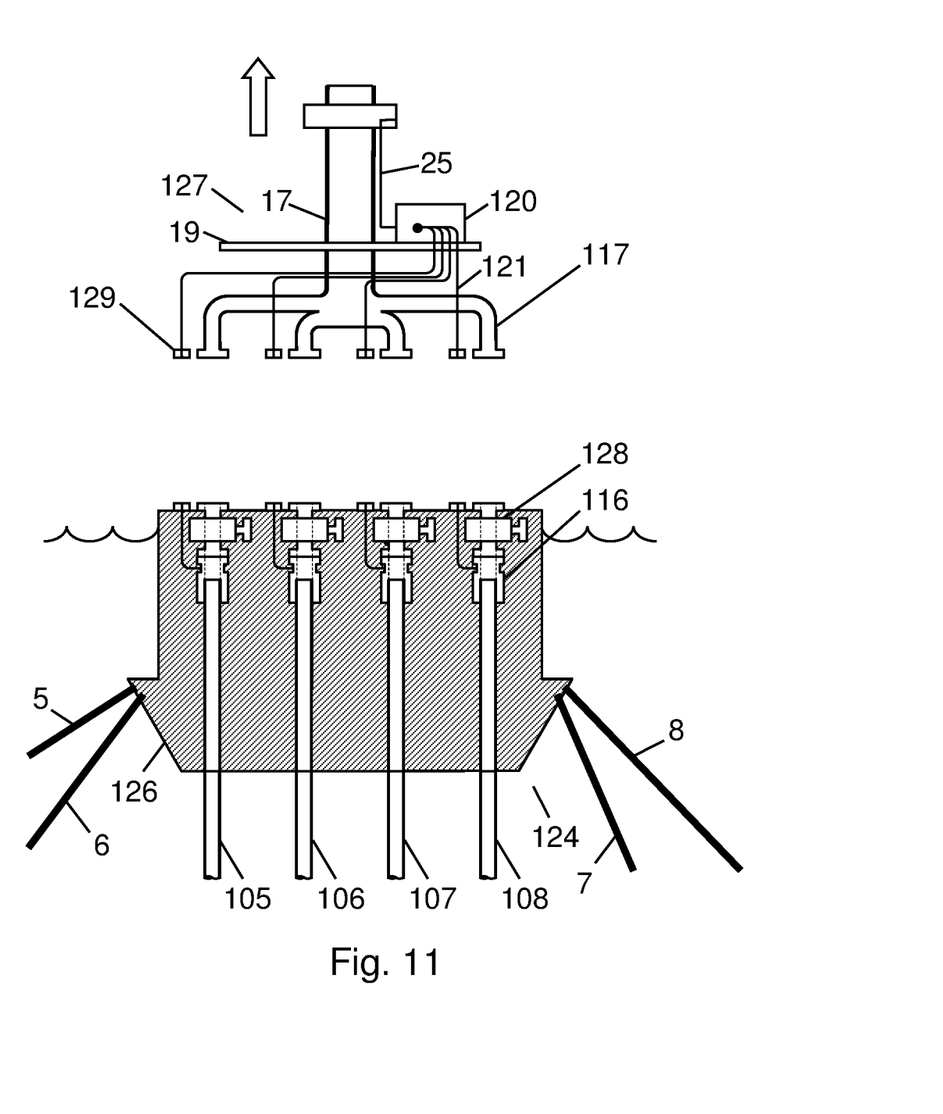
FIG. 11 shows the turret of FIG. 10 when the upper part and the lower part have been separated from each other.

In a situation where the lower part 126 of the turret 124 should be separated from the FPSO 1, the valves 128 are closed and the upper part 127 and the lower part 126 are then separated from each other as illustrated in FIG. 11. Normally, the upper part 127 will remain in the FPSO 1.

In the embodiments described above, the invention is described in relation to a so-called internal turret, where the turret is located in the hull of a vessel, i.e. in this case the FPSO 1. Typically, the turret is located in the front end of the FPSO, but in some cases, the turret can be found in the middle of the ship. However, the invention can also be used in combination with an external turret, where the turret is located outside the hull of the ship, e.g. at the bow or stern of the vessel.

Figure 12:
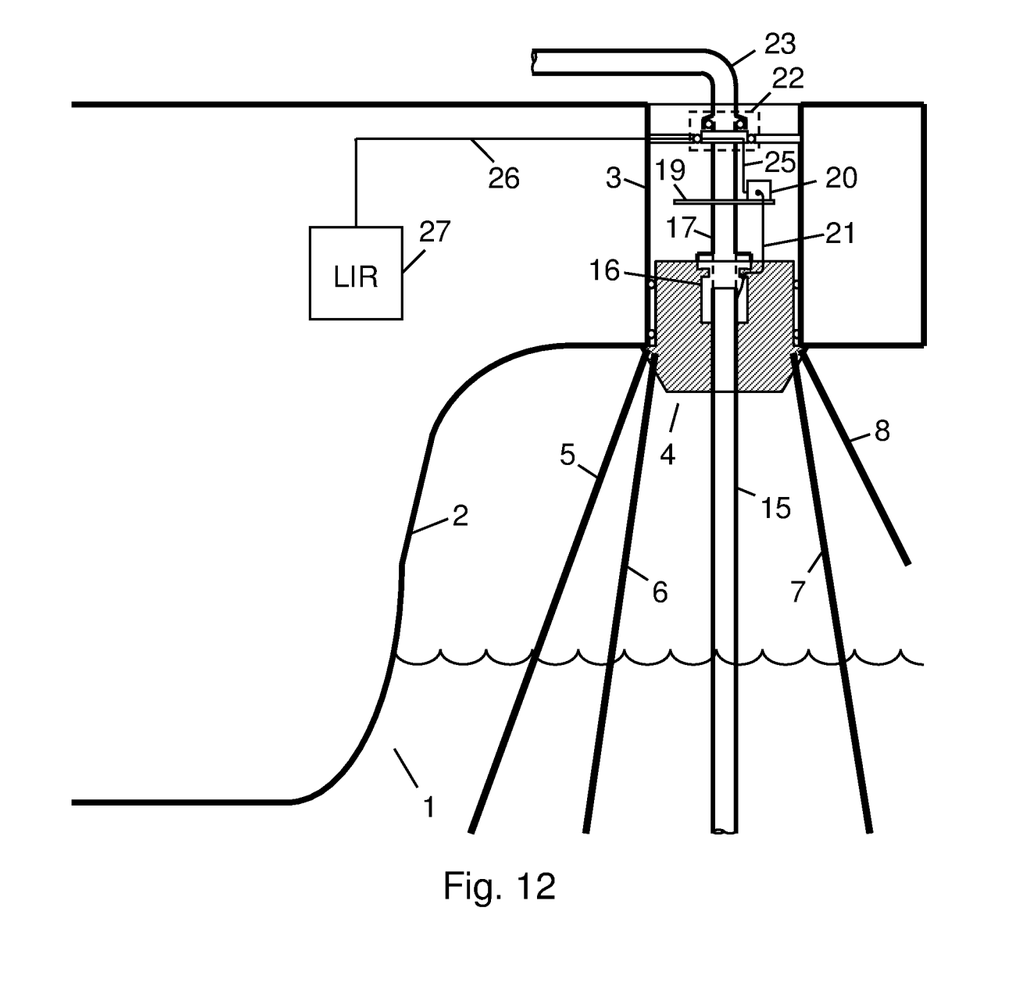
FIG. 12 shows a floating production, storage and offloading (FPSO) unit having an external turret, where the turret on which interrogating equipment is arranged is located outside the hull of the ship.

An example of this is shown as the FPSO 131 in FIG. 12. The hull 132 of the FPSO 131 is provided with a projection 135, e.g. at the bow of the FPSO 131. This projection 135 has a substantially vertical shaft, chamber or compartment 133 for receiving and supporting the turret 134. Similarly to the turret 4 in FIG. 1, the turret 134 is moored to the seabed by chains or wires 5, 6, 7 and 8 ensuring that the turret can maintain a geostatic position, and a riser in the form of an unbonded flexible pipe 15 coming from the seabed is connected to the turret 134 by means of an end-fitting 16. The upper part of the turret 134 comprises a pipe 17 connected to the end-fitting 16, so that the flow of liquids and/or gases arriving on board the FPSO 131 from e.g. subsea oil wells via the unbonded flexible pipe 15 continues through the pipe 17. A platform 19 on which the interrogating equipment 20 can be arranged is attached to the pipe 17. Alternatively, the interrogating equipment 20 can be arranged directly at the top side of the turret 134 itself.

An optical fibre 21, or another type of optical waveguide, connects the optical fibre of the unbonded flexible pipe 15 to the interrogating equipment 20, but as mentioned earlier, the overlength of the fibre 41 in the exit cavity 71 of the end-fitting 16 may also be sufficiently long for connecting the fibre 41 directly to the interrogating equipment 20. Since the interrogating equipment 20 is placed on the geostationary turret 134, a connection of sufficient quality between the optical fibre 41 and the interrogating equipment 20 is ensured, even when the FPSO 131 rotates around the turret 134 according to changing weather conditions.

A swivel device 22 joins the pipe 17 on the geostationary turret 4 with another pipe 23, which is a part of the FPSO 131 and thus able to turn with respect to the geostationary turret 134. The pipe 23 leads to processing equipment and/or storage on the FPSO. In this way, the swivel device 22 provides a fluid transfer path between the turret 134 and the free weathervaning FPSO 131 when the FPSO rotates around the turret. Through a slip ring, the swivel device 22 can transmit electrical signals between the turret 134 and the FPSO 131. In this case, an electrical output signal from the interrogation equipment 20 can be transmitted via the electrical connection 25, the swivel device 22 and the electrical connection 26 to a local instrumentation room 27 placed on board the FPSO 131. This connection can of course also be used to control the interrogating equipment 20 from the local instrumentation room 27. As mentioned above, this connection may typically be an Ethernet connection.

Figure 13:
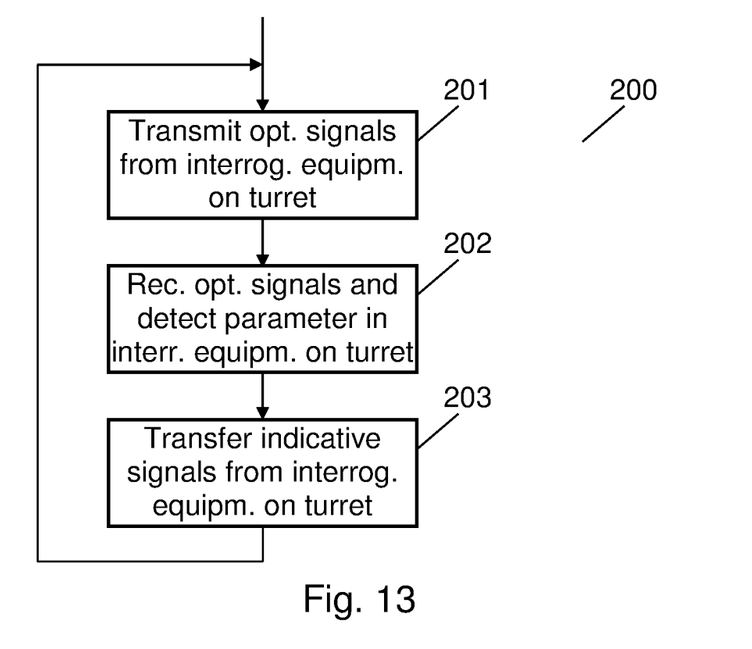
FIG. 13 shows a flow chart illustrating a method of detecting a parameter in an unbonded flexible pipe from interrogating equipment arranged on a turret on a floating production, storage and offloading (FPSO) unit.

FIG. 13 shows a flow chart 200 illustrating a method of detecting a parameter, such as a temperature or strain value, in an unbonded flexible pipe having one or more optical fibres integrated in an armouring layer, where the unbonded flexible pipe is connected rotationally to a floating vessel via a turret and a swivel device as described above. In step 201, optical signals are transmitted into the one or more optical fibres from an optical transmitter in interrogating equipment that is arranged on the turret, so that the optical fibre can be connected to the interrogating equipment without having to pass through a swivel device. In step 202, optical signals reflected from the optical fibre in response to the optical signals transmitted into the fibre in step 201 are received in an optical detector in the interrogating equipment that is arranged on the turret, and the parameter of the unbonded flexible pipe is detected from the optical signals received from the fibre. Finally, in step 203, signals indicative of the detected parameter is transferred to receiving equipment placed on the floating vessel from the interrogating equipment that is arranged on the turret. As described above, this can be done by transmission through the swivel device, by wireless transmission or by storing the dato on a storage medium in the interrogation equipment for subsequent manual retrieval at a certain frequency.

Although various embodiments of the present invention have been described and shown, the invention is not restricted thereto, but may also be embodied in other ways within the scope of the subject-matter defined in the following claims.

What is claimed is:

1. A flexible pipe system comprising:
   an unbonded flexible pipe comprising at least one armouring layer and being connected to a floating vessel;
   a sensor system adapted for detecting changes in strain and/or temperature in the unbonded flexible pipe and comprising:
     at least one optical fibre integrated in the at least one armouring layer of the unbonded flexible pipe; and
     interrogating equipment comprising an optical transmitter configured to transmit optical signals into said at least one optical fibre; and an optical detector configured to receive optical signals reflected from said at least one optical fibre and to detect therefrom at least one parameter in said unbonded flexible pipe;
   a turret for rotationally connecting the unbonded flexible pipe to the floating vessel, said turret being supported by a substantially vertical shaft in the floating vessel and comprising an end-fitting for terminating and securing said unbonded flexible pipe to the turret; and
   a swivel device for rotationally connecting the turret to the shaft of the floating vessel and providing a fluid transfer passage between the turret and the floating vessel,
     wherein said interrogating equipment is located on said turret and between the swivel device and the end-fitting so that optical signals reflected from the fibre can reach the interrogating equipment without being distorted in the swivel device and is further configured to transfer signals indicative of said at least one detected parameter to receiving equipment on said floating vessel, and wherein
     said interrogating equipment comprises a transmitter for transmitting said signals indicative of said at least one detected parameter as wireless signals to the receiving equipment on said floating vessel.

2. A flexible pipe system according to claim 1, wherein said interrogating equipment comprises a storage medium for storing said indicative signals for subsequent manual retrieval.

3. A flexible pipe system according to claim 1, wherein said receiving equipment is arranged in a local instrumentation room on said floating vessel.

4. A flexible pipe system according to claim 1, wherein said interrogating equipment is arranged in an enclosure that is certified according to ATEX Zone 1 and rated to IP68.

5. A flexible pipe system according to claim 1, wherein said turret is an internal turret located in the hull of said floating vessel.

6. A flexible pipe system according to claim 1, wherein said turret is an external turret located in a projection extending from the hull of said floating vessel.

7. A flexible pipe system according to claim 1, wherein a plurality of optical fibre sensors are arranged along said optical fibre.

8. A flexible pipe system according to claim 6, wherein said plurality of optical fibre sensors are intrinsic sensors integrated in said optical fibre.

9. A flexible pipe system according to claim 6, wherein said plurality of optical fibre sensors are extrinsic sensors connected to said optical fibre.

10. A method of detecting at least one parameter in an unbonded flexible pipe having at least one armouring layer in a flexible pipe system further comprising:
    a turret for rotationally connecting the unbonded flexible pipe to a floating vessel, said turret being supported by a substantially vertical shaft in the floating vessel and comprising an end-fitting for terminating and securing said unbonded flexible pipe to the turret;
    a swivel device for rotationally connecting the turret to the shaft of the floating vessel and providing a fluid transfer passage between the turret and the floating vessel; and
    a sensor system for detecting said at least one parameter comprising at least one optical fibre integrated in the at least one armouring layer of the unbonded flexible pipe, wherein said at least one parameter being changes in strain and/or temperature in the unbonded flexible pipe,
    and wherein the method comprising the steps of:
    transmitting optical signals into said at least one optical fibre from an optical transmitter of interrogating equipment arranged on said turret, wherein the interrogating equipment is located between the swivel device and the end-fitting:
    receiving optical signals reflected from said at least one optical fibre without being distorted in the swivel device and detecting therefrom said at least one parameter in said unbonded flexible pipe in an optical detector of said interrogating equipment located on said turret; and
    transferring signals indicative of said at least one detected parameter to receiving equipment on said floating vessel from said interrogating equipment arranged on said turret,
    wherein the method further comprises the step of transmitting said signals indicative of said at least one detected parameter to the receiving equipment on said floating vessel from said interrogating equipment arranged on said turret as wireless signals.

11. A method according to claim 10, wherein the method further comprises the step of storing said indicative signals on a storage medium in said interrogating equipment for subsequent manual retrieval.

* * * * *

UNITED STATES PATENT AND TRADEMARK OFFICE
CERTIFICATE OF CORRECTION

| | |
|---|---|
| PATENT NO. | : 11,092,264 B2 |
| APPLICATION NO. | : 16/320633 |
| DATED | : August 17, 2021 |
| INVENTOR(S) | : Bo Asp Moller Andersen et al. |

It is certified that error appears in the above-identified patent and that said Letters Patent is hereby corrected as shown below:

In the Specification

Column 15, Line 12, "storing the dato on" should read -- storing the data on --.

Signed and Sealed this
Thirty-first Day of May, 2022

Katherine Kelly Vidal
*Director of the United States Patent and Trademark Office*